United States Patent
Shieh

(10) Patent No.: US 7,392,944 B2
(45) Date of Patent: Jul. 1, 2008

(54) MANAGING CONTENT AT A PORTABLE, CONTENT ADJUSTABLE PERSONAL IDENTIFICATION DEVICE

(75) Inventor: Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/466,169

(22) Filed: Aug. 22, 2006

(65) Prior Publication Data

US 2008/0048021 A1 Feb. 28, 2008

(51) Int. Cl.
G06K 7/01 (2006.01)
G06K 5/00 (2006.01)

(52) U.S. Cl. .............. 235/382.5; 235/380; 235/382; 340/5.1; 340/5.2; 340/5.21; 340/5.22; 340/5.28; 705/5; 705/6

(58) Field of Classification Search ...... 235/380–382.5; 340/5.1–5.81
See application file for complete search history.

(56) References Cited

U.S. PATENT DOCUMENTS

| | | | |
|---|---|---|---|
| 5,960,085 A * | 9/1999 | de la Huerga | 340/10.41 |
| 6,394,356 B1 * | 5/2002 | Zagami | 235/382 |
| 6,427,909 B1 | 8/2002 | Barnes et al. | |
| 6,427,910 B1 | 8/2002 | Barnes et al. | |
| 6,427,911 B1 | 8/2002 | Barnes et al. | |
| 6,431,443 B1 | 8/2002 | Barnes et al. | |
| 6,594,762 B1 * | 7/2003 | Doub et al. | 235/385 |
| 6,711,414 B1 * | 3/2004 | Lightman et al. | 340/853.2 |
| 6,778,066 B2 * | 8/2004 | Smith | 235/380 |
| 7,176,849 B1 * | 2/2007 | Mooney et al. | 345/2.3 |
| 2004/0056087 A1 | 3/2004 | Bonneau | |
| 2004/0099731 A1 | 5/2004 | Olenick | |

FOREIGN PATENT DOCUMENTS

WO WO 8809019 A1 11/1998
WO WO 9945505 C1 10/1999

* cited by examiner

Primary Examiner—Steven S Paik
Assistant Examiner—Christle I Marshall
(74) Attorney, Agent, or Firm—Matthew W Baca; Amy J Pattillo

(57) ABSTRACT

In one embodiment, at least one information control device manages the content displayed on multiple separate portable, content adjustable personal identification devices. The information control device automatically selects at least one content specification for transmission to any portable, content adjustable personal identification devices moving either into or out of a particular area delimited by a boundary secured by the information control device. The information control device then transmits the selected content specification for detection by portable, content adjustable personal identification devices, wherein the content specification directs display of identification content on each of the portable, content adjustable personal identification devices.

7 Claims, 4 Drawing Sheets

MANAGING CONTENT AT A PORTABLE, CONTENT ADJUSTABLE PERSONAL IDENTIFICATION DEVICE

BACKGROUND OF THE INVENTION

1. Technical Field

The present invention relates in general to improved identification security. In particular, the present invention relates to managing content displayed on a portable, content adjustable personal identification device based on a location of the portable, content adjustable personal identification device.

2. Description of the Related Art

In many environments, having proper identification is important. For example, many businesses require that employees wear a badge while in the workplace, where the badge includes a photo identifying the employee and the employee's name and other identifying information. In another example, students and teachers may be required to wear badges when on campus grounds or in other areas where proper identification is required for entry.

In addition, in many environments, having proper identification is important to gain access into particular areas. For example, badges may also include a bar code or radio-frequency identifier (RFID) chip encoded with identification information that is detectable by readers located at different security points. A business may place a badge reader at each employee entrance, where the reader detects each employee identification from the badge, determines whether the employee is authorized to use the entrance, and controls access for that employee to the entrance. In addition, a badge reader may detect each employee exit a building so that the presence of a "badged" employee, within the workplace, can be tracked.

When an employee or other person wearing identification leaves the environment where identification is required, that person or the employer of that person may not want others seeing the identification outside the workplace. Further, many employers do not want employees to call attention to their association to the employer in public. Thus, some employers will require employees to "debadge" when in public, however, many times, employees will forget to debadge or will decide to flip a badge over, in an effort to hide the identification printed on the badge. Further, in other circumstances, an employee leaving a secured environment may not have a place to store the identification so that it is not visible or accessible to others in the public arena.

Therefore, in view of the foregoing, it would be advantageous to provide a method, system, and program for controlling the content output on a portable, content adjustable, personal identification device so that a person's personal information is adjusted based on the area in which the person is located with the identification device.

SUMMARY OF THE INVENTION

Therefore, the present invention provides improved identification security. In particular, the present invention provides for managing content displayed on a portable, content adjustable personal identification device based on a location of the portable, content adjustable personal identification device.

In one embodiment, at least one information control device manages the content displayed on multiple separate portable, content adjustable personal identification devices. The information control device automatically selects at least one content specification for transmission to any portable, content adjustable personal identification devices moving either into or out of a particular area delimited by a boundary secured by the information control device. The information control device then transmits the selected content specification for detection by portable, content adjustable personal identification devices, wherein the content specification directs display of identification content on each of the portable, content adjustable personal identification devices.

In addition, the information control device may monitor at least one point along the boundary to detect a presence of a particular portable, content adjustable personal identification device, detect an identification for a user associated with the particular portable, content adjustable personal identification device, and designate the content specification, based on the identification of the user, for transmission to and controlling output of content displayed by the particular portable, content adjustable personal identification device. In monitoring at least one point along the boundary, the information control device may monitor the boundary using a radio frequency identifier (RFID) reader that creates a radio frequency field and detects the identification for the user from a radio frequency transmission from the particular portable, content adjustable personal identification device. In addition, in monitoring at least one point along the boundary, the information control device may monitor the boundary using a barcode scanner that reads the identification for the user from a bar code affixed to the particular portable, content adjustable personal identification device.

The information control device controls the size, shape, and location of a boundary. In addition, the information control device may adjust the boundary based on a scheduled event within a particular area with a particular selection of content specifications required for display within the bounded area during the scheduled event.

A portable, content adjustable personal identification device receiving a content specification includes an input interface for receiving the content specification from at least one information control device, a display interface for displaying particular content as directed by the at least one content specification, and at least one processor for controlling the output of the selection of content according to the at least one content specification on the display interface. In particular, the processor controls output of the selection of content according to at least one content specification by changing the displayed content from a first selection of content to a second selection of content.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
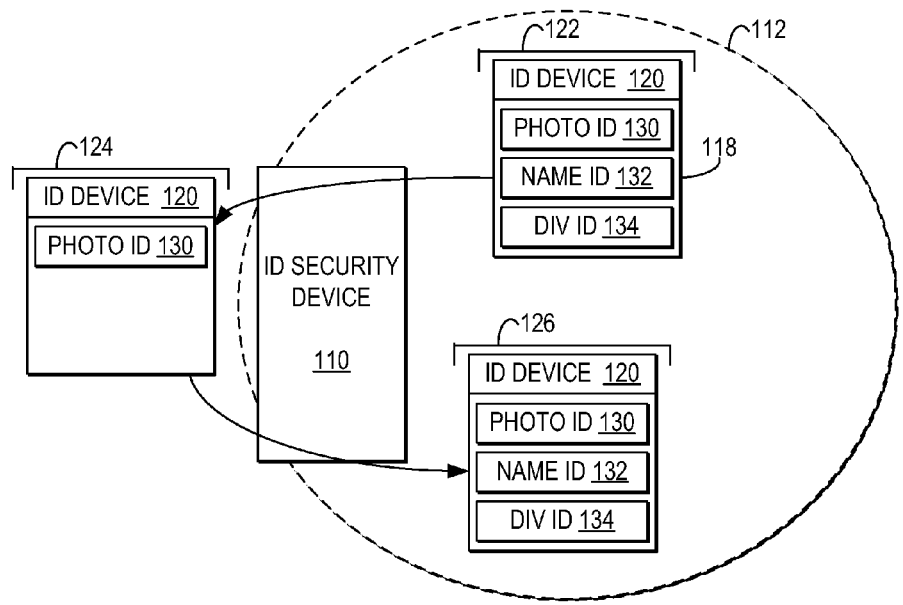
FIG. 1 is a block diagram depicting one embodiment of an environment for managing content at a portable, content adjustable personal identification device.

Referring now to FIG. 1, a block diagram depicts one embodiment of an environment for managing content at a portable, content adjustable personal identification device. In the example, an identification (ID) device 120 is located within an area delineated by boundary 112 at a first position 122. ID device 120 is a portable, content adjustable identification device associated with a particular user, group of users, organization, or other entity, with a content adjustable interface 118. At first position 122, the content displayed within content adjustable interface 118 includes a photo identification (ID) 130, a name identification (ID) 132, and a division (DIV) identification 134. It will be understood that additional or alternate types of content may be displayed within content adjustable interface 118 and that identification device 120 may include other content that is statically displayed separate from content adjustable interface 118.

The area delineated by boundary 112 may be monitored by one or more identification security devices, such as identification (ID) security device 110. In one example, ID security device 110 represents an identification device checkpoint, at which a person must present an identification device for entry and exit into the area delineated by boundary 112. In another example, ID security device 110 includes at least one device reader for entry into the area delineated by boundary 112 and a transmitter for transmitting a signal, detectable by valid identification devices, such as ID device 120, indicating the edge of boundary 112 at one or more exit points from the area delineated by boundary 112. For example, ID security device 110 may include transmitters at the exit points of a parking garage, such that the parking garage area is included within the area delineated by boundary 112. In addition, ID security device 110 may provide a local network connectable by ID device 120, where the local network connection includes, but is not limited to, an infrared connection, a Bluetooth enabled connection, a wireless fidelity (Wi-Fi) connect, or a wired local connection.

In addition, it is important to note, the area delineated by boundary 112 may correspond with physical boundaries, such as doors, windows, walls, gates, and other physical structures, or may correspond with electronically defined boundaries from the coverage area of a transmitter. Boundary 112 may include one or more entrance and exit points. In addition, it will be understood that while in the example, boundary 112 is represented by a circular area, in additional or alternate embodiments, boundary 112 may take on any shape, may include multiple overlapping areas, may overlap with other boundaries, may include breaks in coverage area.

In the example, as a person leaves the area delineated by boundary 112, ID device 120 detects from ID security device 110 that ID device 120 is leaving the area delineated by boundary 112 and ID device 120 dynamically adjusts the content output within content adjustable interface 118. For example, at a second position 124, outside boundary 112, the content displayed within content adjustable interface 118 includes photo identification 130, but the areas that previously includes name identification 132 and division identifier 134, are now blank. By removing name identification 132 and division identifier 134 from content adjustable interface 118, the person carrying identification device 120 can continue to carry identification device 120, outside of the environment delineated by boundary 112, without providing name and division information to persons outside the area delineated by boundary 112. In an alternate example, instead of removing particular types of content, identification device 120 may alter the displayed content to content including a fake identity or a covert identity, for example.

Next, in the example, as the person reenters the area delineated by boundary 112, as represented by a third position 126, ID device 120 detects from ID security device 110 that ID device 120 is entering the area delineated by boundary 112 and ID device 120 dynamically adjusts the content displayed on content adjustable interface 118 to include photo identification 130, name identification 132 and division identification 134. By adjusting the displayed content within content adjustable interface 118 when a person reenters the area delineated by boundary 112, ID device 120 displays identifying information required for a person carrying a badge within the area delineated by boundary 112.

In one embodiment, ID device 120 stores the displayed content in differing sets of identifying information to be displayed within content adjustable interface 118 when ID device 120 detects that the device is within a particular type of boundary and detects that the device is leaving a particular type of boundary. In addition, differing sets of identifying information may be stored for differing types of boundaries, such that a person may use a single identification device that displays different types of identifying information in different environments.

In another embodiment, ID device 120 receives the content to be displayed within content adjustable interface 118 when ID security device 110 detects ID device 120 entering or leaving the area delineated by boundary 112. Alternative, ID device 120 receives an indicator of the types of identifying information required for the displayable content from ID security device 110 when ID device 120 enters or exits the area delineated by boundary 112.

It is important to note that while ID security device 110 is described with reference to a person carrying or wearing ID security device 110, it will be understood that ID security device 110 may be carried, worn, or otherwise affixed, temporarily or permanently, to a person or any other identifiable, mobile entity.

Figure 2:
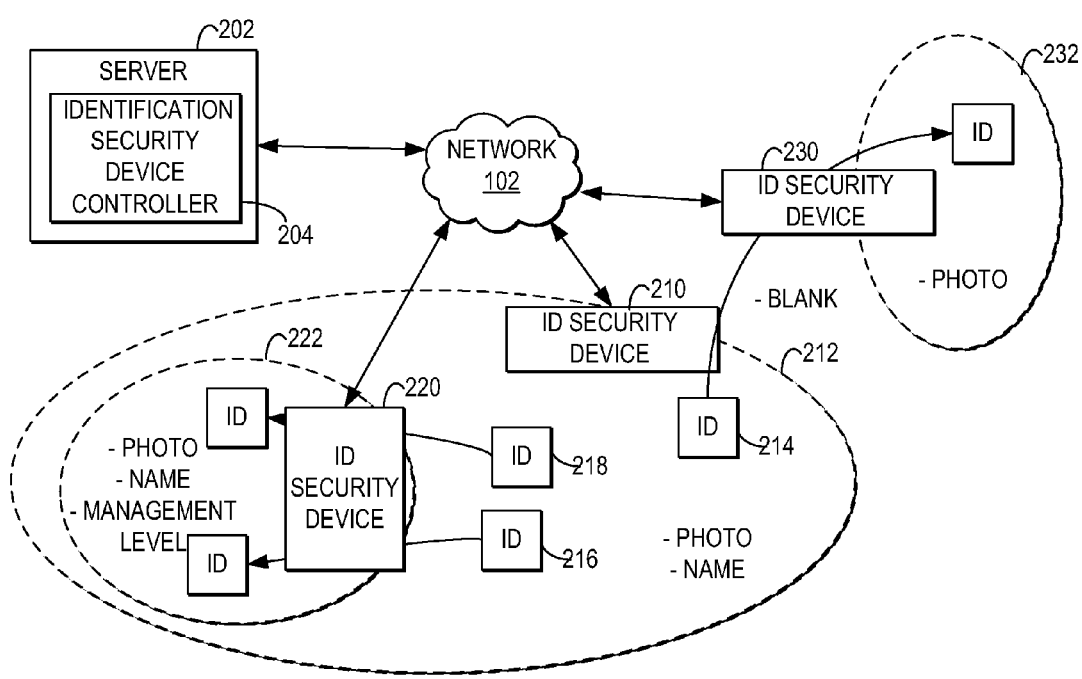
FIG. 2 is a block diagram illustrating one embodiment of a network environment for managing content at multiple portable, content adjustable personal identification device.

With reference now to FIG. 2, a block diagram depicts one embodiment of a network environment for managing content at multiple portable, content adjustable personal identification device. In the example, a network 102 communicatively connects multiple ID security devices 210, 220, and 230 with a server 202. While in the embodiment server 202 is depicted as a separate system from ID security devices 210, 220, and 230, it is important to note that server 202 may also be implemented as an ID security device.

Server 202 includes an identification security device controller 204 for directing ID security devices 210, 220, and 230 what to communicate with content adjustable identification devices within different areas. Network 102 may include, but is not limited to, packet-switching networks, such as the Internet or an intranet, and telephony networks. In particular, network 102 may include routers, switches, gateways, and other hardware to enable a communication channel between ID security devices 210, 220, and 230 and server 202.

In the example, ID security device 210 manages the security for ID devices within an areas delineated by a boundary 212 and ID security device 220 manages the security for ID devices within an area delineated by boundary 222, where the area delineated by boundary 222 is a subset of the area delineated by boundary 212. In addition, in the example, ID security device 230 manages the security for ID devices within an area delineated by boundary 232.

In one embodiment, ID security devices 210, 220 and 230, as directed by identification security device controller 204, control output of data transmissions indicating types of content to be displayed, which are detectable by ID devices, wherein each ID device then selects from locally stored identification content for display within each separate content adjustable interface of each ID device. In addition, in another example, as directed by identification security device controller 204, ID security devices 210, 220, and 230 may control output of data transmissions that indicate the type of area being secured, wherein each ID device then selects from locally stored identification content for display within the type of area identified.

In another embodiment, ID security devices 210, 220, and 230, as directed by identification security device controller 204, detect an identifier from an ID device entering or exiting a particular boundary, transmit the identifier to identification security device controller 204, and receive the personalized identification content to be sent to the ID device from identification security device controller 204. The ID security device receiving personalized identification content transmits the personalized content to the respective ID device, wherein the ID device receiving personalized content controls display of the personalized content within the content adjustable interface of the identification device.

In the example, a different selection of the total available identification content designated within each of boundaries 212, 222, and 232. For example, within the area delineated by boundary 212, as directed by ID security device 210, ID devices 214, 216 and 218 include a photo and a name associated with each person entering the area delineated by boundary 212. In addition, in the example, as the people wearing ID devices 216 and 218 enter the area delineated by boundary 222, ID security device 220 directs identification devices 216 and 218 to include a photo, name, and management level. In one example, a separate color may be assigned to represent each management level and the tinting of each identification device is adjusted to the color representing the management level of the device holder. Further, in the example, as a person wearing ID device 214 travels between the areas delineated by boundary 212 and boundary 232, ID security device 210 directs ID device 214 to blank out any identification content within the content displayable interface, but as the person wearing ID device 210 enters the area delineated by boundary 232, ID security device 230 directs ID device 214 to display content including a photo identifying the device wearer.

As illustrated in the example, by enabling ID security devices to provide data transmission directing identification devices to adjust the content displayed to identify a device holder, a business or other entity may direct the adjustment of identification content on each person's ID device, via identification security device controller 204, at each individual checkpoint. In addition, by enabling ID security devices to transmit signals or information directing identification devices to adjust the content displayed to identify a device holder, a business or other entity may set rules to vary the content displayed on different identification devices within a same bounded area. For example, identification security device controller 204 may specify more information for display on the information devices of selected persons or groups of people.

In one example, the area delineated by boundaries 212 and 232 may represent separate buildings, where employees must pass through a public area to go from building to building. In another example, a service provider may issue an identification device that is controllable at multiple locations, independent of the business or other entity that provides the area, such that the areas delineated by boundaries 212 and 232 may represent areas in which the content displayed on ID devices entering and exiting the areas is controlled by the service provider through communications between ID security devices 210 and 230 and identification security device controller 204.

In another example, the area delineated by boundary 222 may be a temporary boundary, set up for a particular purpose, with particular types of content required within the temporary areas. For example, a building represented by boundary 212 may include a conference room represented by boundary 222, where an employer may position ID security device 220 and direct identification security device controller 204 to temporarily control the content of ID devices entering the conference room.

In addition to directing ID security devices 210, 220, and 230 as to the information to include in data transmissions, identification security device controller 204 may also direct ID security devices 210, 220, and 230 as to the size, shape, and dimension of the areas delineated by boundaries 212, 222, and 232, respectively. In one example, where ID security device 220 is a portable device with an RF field or wireless field for detecting the presence of ID devices within a particular field area, identification security device controller 204 may direct ID security device 220 as to the size, shape, and dimension of the field.

Figure 3:
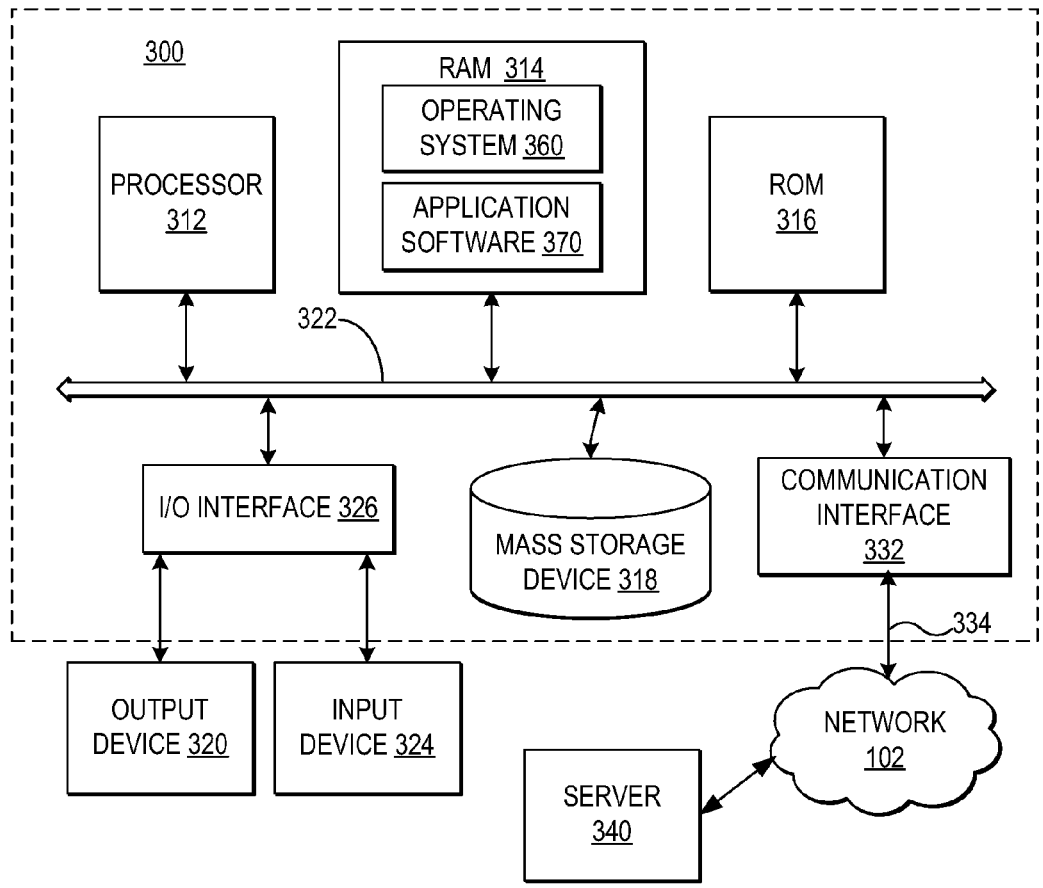
FIG. 3 is a block diagram depicting an example of a computer system in which the present method, system, and program may be implemented.

With reference now to FIG. 3, a block diagram illustrates an example of a computer system in which the present invention may be implemented. The present invention may be executed in a variety of systems and combinations of systems, made up of functional components, such as the functional components described with reference to computer system 300 and may be communicatively connected to a network, such as network 102.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, additional controllers (not depicted) for managing bus access and locks may be implemented.

Processor 312 may be a general-purpose processor such as IBM's PowerPC (PowerPC is a registered trademark of International Business Machines Corporation) processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. In one embodiment, the operations performed by processor 312 may control management of content displayed on portable, content adjustable identification devices as depicted in the operations of flowchart of FIGS. 7-9 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 300 to perform a process according to the present invention. The term "machine-readable medium" as used herein includes any medium that participates in providing instructions to processor 312 or other components of computer system 300 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318 which as depicted is an internal component of computer system 300, but will be understood to also be provided by an external device. Volatile media include dynamic memory such as RAM 314. Transmission media include coaxial cables, copper wire or fiber optics, including the wires that comprise bus 322. Transmission media can also take the form of acoustic or light waves, such as those generated during radio frequency or infrared data communications.

Moreover, the present invention may be downloaded or distributed as a computer program product, wherein the program instructions may be transferred from a remote computer such as a server 340 to requesting computer system 300 by way of data signals embodied in a carrier wave or other propagation medium via network 102 to a network link 334 (e.g. a modem or network connection) to a communications interface 332 coupled to bus 322. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 102. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 102 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, a body scanning system, a keyboard, a mouse, or other input peripheral device, communicatively enabled on bus 322 via I/O interface 326 controlling inputs. In addition, for example, a display device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 4:
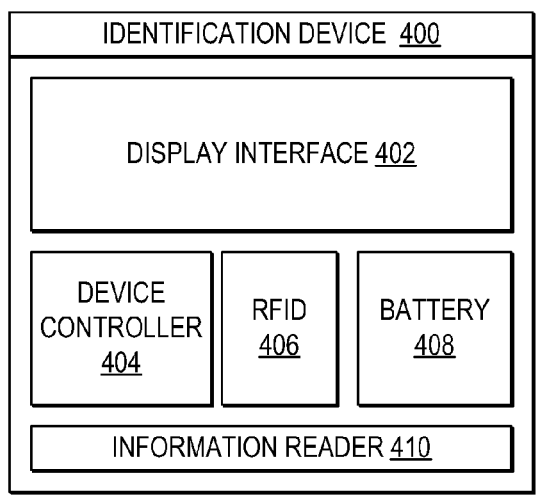
FIG. 4, a block diagram illustrating one embodiment of a content adjustable, portable identification device.

Referring now to FIG. 4, a block diagram illustrates one embodiment of a content adjustable, portable identification device. In the example, identification (ID) device 400 includes a display interface 402, where display interface 402 includes at least one content-adjustable portion. In one example, display interface 402 includes an LCD or other display screen. In addition, display interface 402 may include other types of adjustable display mediums.

In addition, ID device 400 includes an RFID chip 406 for passively enabling output of data to an RFID reader. Although not depicted, RFID chip 406 may be implemented through a small memory module interfacing with a passive RF antenna. The RF antenna is designed to read the RFID data from the memory module using energy generated by the RF field from an RF reader, such as an ID security device, transmitting the RF field. In one example, the data passively output from RFID 406 includes identification information, such as an employee name, number, and other individually identifying information.

It will be understood that ID device 400 may include additional or other types of data storage media enabled to actively or passively transmit identification information. In addition, it will be understood that ID device 400 may include additional or other types of data storage media from which identification information may be read, such as a bar code or other scannable media.

Further, in the example, ID device 400 includes an information reader 410 for detecting data from an ID security device. For example, information reader 410 may detect a data transmission from an ID security device indicating an edge of a boundary. In another example, information reader 410 may detect a data transmission from an ID security device that specifies the types of identification content permitted to be displayed on display interface 402 within a particular bounded area. In yet another example, information reader 410 may detect a signal transmitted from an ID security device that includes the actual identification content to be displayed on display interface 402.

ID device 400 includes a battery 408 for providing power to the components of ID device 400. It will be understood that battery 408 may be implemented using multiple types of portable power sources. In addition, it will be understood that in alternate embodiments, battery 408 may be integrated within one of the components of identification device 400.

In addition, ID device 400 includes a device controller 404 of a processor, memory, and other components required for controlling the components of ID device 400. Device controller 404 receives detected data transmissions from information reader 410 and controls the display of information on display interface 402. It will be understood that ID device 400 may include additional or alternate display interface controllers.

In one example, device controller 404 includes stored personal identification content for a particular person, wherein upon detection of a boundary and the type of identification content to be displayed at that boundary, device controller 404 adjusts display interface 402 to only display the specified types of identification content from the stored personal identification content for the particular person. For example, for each person issued an ID device, the personal identification content for that person is transmitted to device controller 404 for storage at the time of issuance.

In another example, device controller 404 receives the actual personal identification content for display from information reader 410 and controls the display of the content at display interface 402. For example, for each person issued an ID device, an identifier for the person is stored on RFID 406, such that ID security device detects the identifier, determines a selection of personal identification content for display within a particular boundary and transmits the displayable, personal identification content for the identified person to ID device 400 at each boundary, wherein device controller 404 receives the actual personal identification content and controls display of the content within display interface 402.

It is important to note that while in the embodiment depicted, ID device 400 includes device controller 404, RFID 406, and information reader 410, in additional or alternate embodiments, ID device 400 may only include one or more of device controller 404, RFID 406, and information reader 410. In addition, it is important to note that in additional or alternate embodiments, the components of ID device 400 may be integrated into a computing system enabled to perform functions in addition to identifying a device holder. For example, ID device 400 may be integrated into a portable telephony device or other portable computing system carried by a person.

Figure 5:
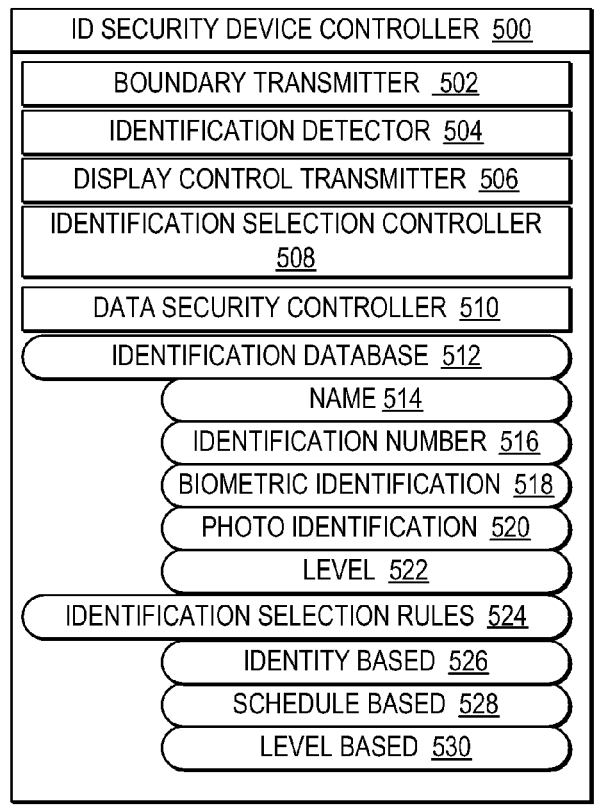
FIG. 5 is a block diagram depicting one embodiment of an ID security device controller.

With reference now to FIG. 5, a block diagram illustrates one embodiment of an ID security device controller. In the example, ID security device controller 500 includes multiple functional components and data storage systems, which may be implemented in a single system or across multiple systems interconnected via a network or other connection. It is important to note that ID security device controller 500 may be implemented within an individual ID security device, such as ID security devices 210, 220, and 230 of FIG. 2 or may be implemented in server 202, as described in FIG. 2. In other embodiments, additional or alternate components may be included within ID security device 500. In addition, in other embodiments, ID security device 500 may be integrated into or implemented within other devices that provide for securing an environment.

In the example, ID security device controller 500 includes a boundary transmitter 502. Boundary transmitter 502 transmits information about a delimited boundary to information devices. In transmitting information about a particular boundary, boundary transmitter 502 may directly transmit information to a particular information device in a local network or may broadcast a signal detectable by any information devices within a particular range. The information or signal may indicate the type of boundary entered into or exited out of.

In addition, in the example, ID security device controller 500 includes a display control transmitter 506. Display control transmitter 506 transmits data specifying the content to be displayed on all devices entering or exiting a boundary or about the content to be displayed on a particular device entering or exiting a boundary. In specifying the content to be displayed, display control transmitter 506 may directly transmit the content for display or the type of content to display to a particular information device or broadcast a signal detectable by any information device specifying the type of content to display.

Further, in the example, ID security device controller 500 includes an identification detector 504. Identification detector 504 facilitates detection of the identification of a person carrying an ID device. In one example, identification detector 504 detects the identification of a person by detecting at least one user identifier from the device itself, such as from an RFID chip by creating an RF field and detecting the transmission of the identifier, from a bar code scan of the identifier, or from other types of detectable information from the ID device. In another example, identification detector 504 facilitates detection of the identification of a person by requiring the person provide a biometric sample or enter a password. It will be understood that identification detector 504 may implement additional and alternate types of identity detection and may access the identification information from hardware specifically designed to detect a user identifying information.

Once identification detector 504 accesses some identifying information for a user, identification detector 504 looks up a user record associated with the accessed identifying information in identification database 512. Identification database 512, accessible to ID security device 500, includes identifying personal information for a registered user. In the example, for each registered user, identification database 512 includes information fields such as, but not limited to, name 514, identification number 516, biometric identification 518, photo identification 520, and level 522, such as a management or security level, for example. Using one piece of identifying information, such as an identification number, identification detector 504 finds the user record within identification database 512 with the field of identification number 516 including a number matching the accessed identification number.

By accessing the identification record for a particular user from identification database 512, display control transmitter 506 can access particular display content for a particular user and transmit the display content to the ID device carried by that person. For example, the photo of a particular user in the field of photo identification 520 may be accessed and transmitted by display control transmitter 506 to a particular ID device. In another example, the management level of a user may be accessed in the field of level 522 and transmitted by display control transmitter 506 to a particular identification device.

In addition, by accessing the identification record for a particular user from identification database 512, additional information included in the fields of an accessed record can be used in filtering through identification selection rules 524. In particular, identification selection rules 524 includes rules for selecting the type of boundary information or content for transmission to direct adjustment of the content visibly displayed on ID devices. Thus, in boundary transmitter 502 selecting the boundary information to transmit or display control transmitter 506 selecting the content to transmit, boundary transmitter 502 and display control transmitter 506 process identification selection rules 524.

Identification selection rules 524 may include different types of variables for selecting the data to transmit to ID devices. In one example, identification selection rules 524 includes identity-based rules 526, which specify content selections based on a user. In another example, identification selection rules 524 may include schedule based rules 528, which specify content requirements for a particular boundary based on a schedule or other circumstances associated with a boundary and may be accessed from a master schedule or from multiple individual schedules. Further, in another example, identification selection rules 524 may include level based rules 530, which specify content requirements based on the management or security level associated with one or more of a particular boundary and a particular management or security level assigned to the identified individual associated with an ID device. In addition, it will be understood that additional and alternate types of variables may be included in the rules used for selecting the data to transmit to each ID device to direct the content for display on each ID device.

It is important to note that while in the embodiment depicted, ID security device controller 500 includes boundary transmitter 502 and display control transmitter 506, in additional or alternate embodiments, ID security device controller 500 may only include one of boundary transmitter 502 and display control transmitter 506, dependent upon the data transmissions required by personal identification devices to adjust the content of the ID devices when entering or exiting a bounded area. In addition, it is important to note that in additional alternate embodiments, the components of ID security device controller 500 may be integrated into a computing system enabled to perform functions in addition to personal identification device content control.

In addition, ID security device 500 may include an identification selection controller 508 for controlling the selection of information to include in identification database 512 and identification selection rules 524. In one example, identification selection controller 508 includes an interface controller for controlling an interface through which a user may select to add, adjust, or cancel information in identification database 512 and identification selection rules 524. In another example, identification selection controller 508 may include a searching tool for accessing schedules for one or more users, determining from the schedules whether there are events that should be included within the schedule based rules 528 and whether to prompt a user to set the content for display on identification devices during the scheduled event within a particular boundary.

Further, ID security device 500 may include a data security controller 510 for controlling the security of information transmitted to and accessed from identification devices. In one example, data security controller 510 may encrypt content selected to be transmitted by display control transmitter 506, such that only the identification device designated to receive the encrypted content is enabled to decrypt the content for display.

Figure 6:
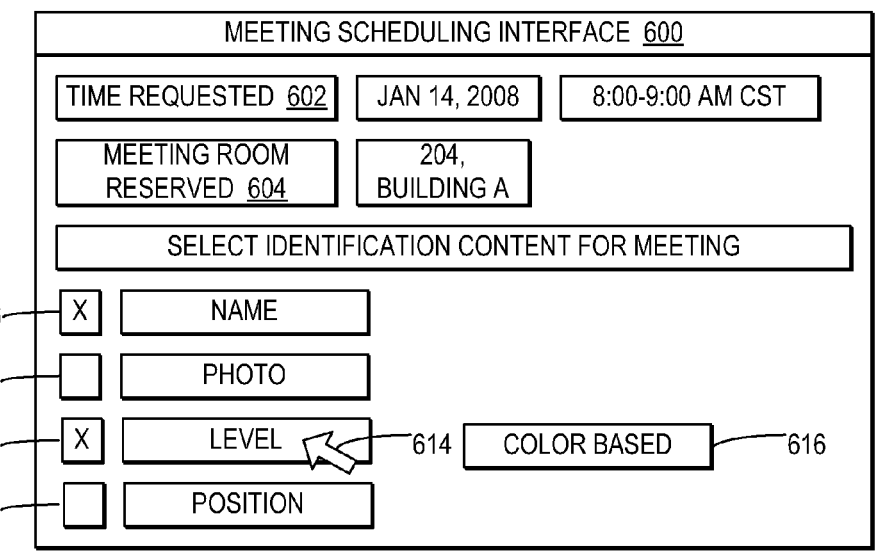
FIG. 6 is an illustrative diagram illustrating an interface through which a user may adjust an identification selection rule.

Referring now to FIG. 6, an illustrative example depicts an interface through which a user may adjust an identification selection rule. In the example, a meeting scheduling interface 600 includes options for a user setting a meeting to also specify the identification content requirements for the meeting. In the example, in scheduling a meeting, the user may select to specify the meeting by selecting options using the placement of cursor 614 or other selection inputs.

For purpose of example, it is illustrated that in response to a user selection of time requested option 602, the user selected a date and time period of "Jan. 14, 2008" from "8:00-9:00 AM CST" and that in response to a user selection of meeting room reserved option 604, the user selected a meeting room of "204, Building A".

According to an advantage of the invention, the user is also provided with an interface option to directly specify, with a scheduled meeting, the identification content required for the meeting, such that the ID security device for the meeting room is directed to apply the selected content to ID devices during the meeting period within the boundary of the selected meeting room. In the example, the user may select to require a name as illustrated at reference numeral 606, a photo as illustrated at reference numeral 608, a level as illustrated at reference numeral 610, and a position as illustrated at reference numeral 612. As indicated by the "X", the user has selected to require a name and security level as content on ID devices during the meeting.

In addition to selecting the types of content for display on ID devices present within the meeting, the user may select how the content is to be displayed. For example, the user has further specified that the security level is to be displayed as a color based representation with each security level illustrated by a different color, as illustrated at reference numeral 616.

Figure 7:
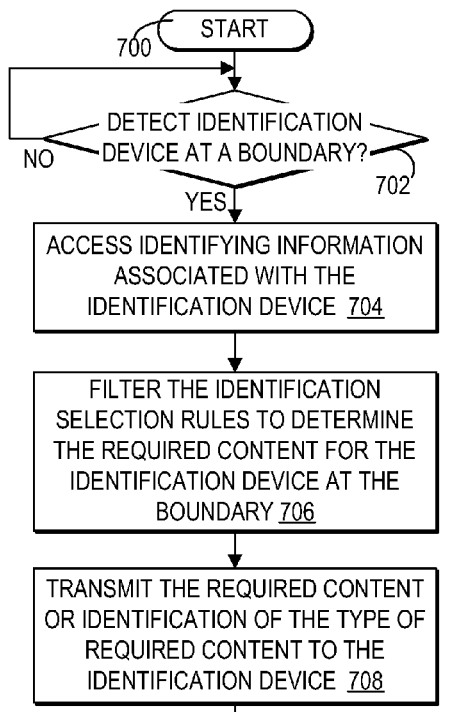
FIG. 7 is a high level logic flowchart depicting a process and program for controlling information output to an ID device at a boundary.

With reference now to FIG. 7, a high level logic flowchart depicts a process and program for controlling information output to an ID device at a boundary. In the example, the process starts at block 700 and thereafter proceeds to block 702. Block 702 depicts a determination whether an ID device is detected at a boundary. If an identification badge is detected at a boundary, then the process passes to block 704. Block 704 illustrates accessing identifying information associated with the ID device. Next, block 706 depicts filtering the identification selection rules to determine the required identification content for the ID device at the boundary. Thereafter, block 708 illustrates transmitting the required content from the identified user's record or transmitting a specification of the type of required content to the detected ID device, and the process ends.

Figure 8:
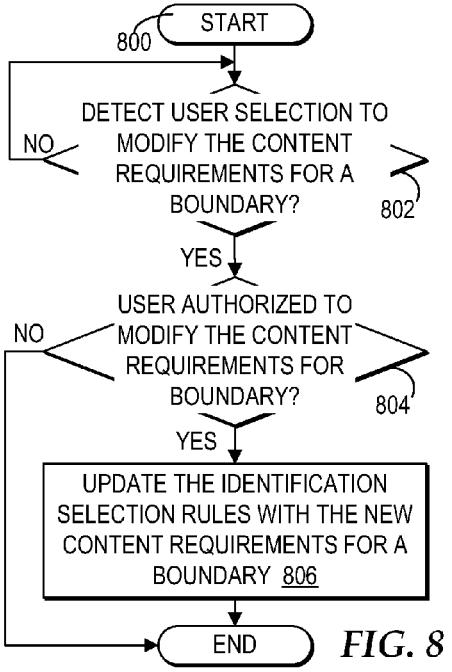
FIG. 8 is a high level logic flowchart illustrating a process and program for adjusting the content specifications for a boundary.

Referring now to FIG. 8, a high level logic flowchart illustrates a process and program for adjusting the content specifications for a boundary. In the example, the process starts at block 800 and thereafter proceeds to block 802. Block 802 depicts a determination whether an ID security device controller detects a user selection to modify the content specifications for a boundary. If there is a user selection to modify the content specifications for a boundary, then the process passes to block 804. Block 804 illustrates a determination whether a user is authorized to modify the content requirements for a boundary. If the user is not authorized, then the process ends. If the user is authorized, then the process passes to block 806. Block 806 depicts updating the identification selection rules with the new content requirements for a boundary, and the process ends.

Figure 9:
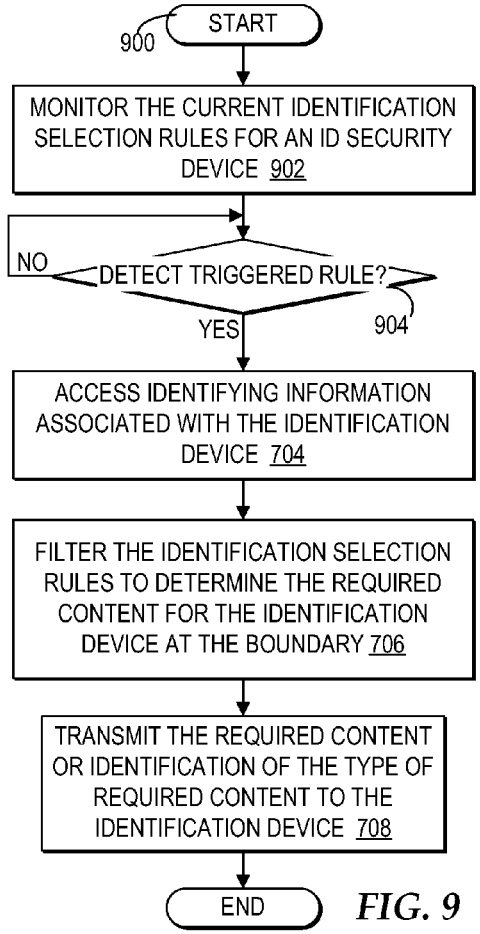
FIG. 9 is a high level logic flowchart depicts a process and program for controlling information output at a boundary.

With reference now to FIG. 9, a high level logic flowchart depicts a process and program for controlling information output at a boundary. In the example, the process starts at block 900 and thereafter proceeds to block 902. Block 902 depicts monitoring the current identification selection rules for an ID security device. Next, block 904 illustrates a determination whether any of the rules are triggered by a change in circumstances or the presence of a scheduled event. If the rules are triggered, then the process passes to block 906. Block 906 illustrates updating the ID security device with the required content or change in boundary size for the triggered rule, such that the boundary transmitter for the ID security device adjusts the signal identifying the boundary itself or identifying the required content changes when entering or exiting the boundary as required by he triggered rule, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for managing content for output at a plurality of separate portable, content adjustable personal identification devices, comprising:

displaying an interface through which a user selects to schedule a meeting period for a particular area delimited by a boundary secured by at least one information control device and through which said user specifies a particular selection of content from among a plurality of types of identification content required to be displayed within said plurality of separate portable, content adjustable personal identification when moving into said particular area during said meeting period;

responsive to detecting said user is authorized to adjust a content specification for said particular area secured by said at least one information control device, automatically updating said content specification with said particular selection of content for said meeting period;

responsive to detecting a current time within said meeting period, automatically selecting, for transmission from said at least one information control device enabled to transmit data to said plurality of separate portable, content adjustable personal identification devices, said content specification for directing display of a portion of said plurality of types of identification content on each of said plurality of separate portable, content adjustable personal identification devices; and transmitting, from said at least one information control device, said at least one content specification for directing each of said plurality of separate portable, content adjustable personal identification devices moving into said particular area delimited by said boundary secured by said at least one information control device to adjust said display of said plurality of types of identification content from a prior selection of content from among said plurality of types of identification content to said content specification comprising said particular selection of content.

2. The method according to claim 1, wherein automatically selecting, for transmission from at least one information control device enabled to transmit data to plurality of separate portable, content adjustable personal identification devices, further comprises:

monitoring at least one point along said boundary to detect a presence of at least one of said plurality of portable, content adjustable personal identification devices;

responsive to detecting a particular portable, content adjustable personal identification device at said at least one point along said boundary from among said plurality of separate portable, content adjustable personal identification devices:

detecting an identification for a particular user associated with said particular portable, content adjustable personal identification device, and designating, based on said identification of said particular user, said content specification for transmission to said particular portable, content adjustable personal identification device.

3. The method according to claim 2, wherein monitoring at least one point along said boundary further comprises:

monitoring said boundary using a radio frequency identifier reader that creates a radio frequency field and detects said identification for said particular user from a radio frequency transmission from said particular portable, content adjustable personal identification device.

4. The method according to claim 2, wherein monitoring at least one point along said boundary further comprises:

monitoring said boundary using a barcode scanner that reads said identification for said particular user from a bar code affixed to said particular portable, content adjustable personal identification device.

5. The method according to claim 1, further comprising:

adjusting, by said information control device, a size of said boundary.

6. The method according to claim 1, further comprising:

encrypting said at least one content specification for secured transmission to at least one of said plurality of separate portable, content adjustable personal identification devices.

7. The method according to claim 1, further comprising:

receiving said at least one content specification at the at least one of said plurality of separate portable, content adjustable personal identification devices, wherein said at least one of said plurality of separate portable, content adjustable personal identification devices comprises an input interface for receiving said content specification from said at least one information control device, a display interface for displaying particular content as directed by said at least one content specification, and at least one processor for controlling output of said selection of content according to said at least one content specification at said display interface.

* * * * *